US010670387B2

(12) United States Patent
Stoppe et al.

(10) Patent No.: US 10,670,387 B2
(45) Date of Patent: Jun. 2, 2020

(54) DETERMINING THE POSITION OF AN OBJECT IN THE BEAM PATH OF AN OPTICAL DEVICE

(71) Applicant: Carl Zeiss Microscopy GmBH, Jena (DE)

(72) Inventors: Lars Stoppe, Jena (DE); Christoph Husemann, Jena (DE); Markus Sticker, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 136 days.

(21) Appl. No.: 15/324,474

(22) PCT Filed: Jul. 10, 2015

(86) PCT No.: PCT/EP2015/065862
§ 371 (c)(1),
(2) Date: Jan. 6, 2017

(87) PCT Pub. No.: WO2016/005571
PCT Pub. Date: Jan. 14, 2016

(65) Prior Publication Data
US 2017/0167856 A1 Jun. 15, 2017

(30) Foreign Application Priority Data
Jul. 10, 2014 (DE) .................. 10 2014 109 687

(51) Int. Cl.
*G01B 11/14* (2006.01)
*G02B 21/06* (2006.01)
(Continued)

(52) U.S. Cl.
CPC ........... *G01B 11/14* (2013.01); *G01B 11/002* (2013.01); *G02B 7/32* (2013.01); *G02B 21/06* (2013.01);
(Continued)

(58) Field of Classification Search
CPC .... G01B 11/14; G01B 11/002; G02B 21/367; G01S 17/95; G01S 17/50; G01S 17/58; G01C 1/00; G01C 3/00
See application file for complete search history.

(56) References Cited

U.S. PATENT DOCUMENTS

| 5,038,258 | A | | 8/1991 | Koch et al. | |
|---|---|---|---|---|---|
| 5,808,291 | A | * | 9/1998 | Nakamura | ............... G02B 7/34 250/201.6 |

(Continued)

FOREIGN PATENT DOCUMENTS

| CN | 101320094 A | 12/2008 |
|---|---|---|
| CN | 101566692 A | 10/2009 |

(Continued)

OTHER PUBLICATIONS

Chamgoulov, Ravil, et al., "Optical Computed-tomographic Microscope for Three-dimensional Quantitative Histology", Cellular Oncology 26, IOS Press, 2004, pp. 1-10.
(Continued)

*Primary Examiner* — Violeta A Prieto
(74) *Attorney, Agent, or Firm* — Murphy, Bilak & Homiller, PLLC (57) ABSTRACT

To determine a position of an object (100) parallel to the optical axis (120) of an optical device (1), the object (100) is illumined from a first illumination direction (210-1) and from a second illumination direction (210-2) and an image (230-1, 230-2) is acquired in each case. The position of the object (100) is determined based on a distance (250) between imaging locations of the object (220-1, 220-2) in the images (230-1, 230-2).

8 Claims, 7 Drawing Sheets

(51) Int. Cl.
*G02B 21/24* (2006.01)
*G02B 7/32* (2006.01)
*G01B 11/00* (2006.01)
*G02B 21/36* (2006.01)
*G01N 21/64* (2006.01)

(52) U.S. Cl.
CPC ......... *G02B 21/245* (2013.01); *G02B 21/367* (2013.01); *G01N 21/6458* (2013.01)

(56) References Cited

U.S. PATENT DOCUMENTS

| | | | | |
|---|---|---|---|---|
| 5,939,705 | A * | 8/1999 | Nakamura | G02B 7/34 250/201.6 |
| 6,262,802 | B1 * | 7/2001 | Kiyono | G01B 11/002 250/237 G |
| 9,068,821 | B2 * | 6/2015 | Fujimoto | G01B 11/14 |
| 9,679,215 | B2 * | 6/2017 | Holz | G06K 9/2036 |
| 9,702,977 | B2 * | 7/2017 | Holz | G01S 17/36 |
| 10,247,933 | B2 * | 4/2019 | Stoppe | H04N 9/07 |
| 2011/0025880 | A1 | 2/2011 | Nandy | |
| 2012/0057013 | A1 | 3/2012 | Ishiwata | |
| 2012/0098950 | A1 * | 4/2012 | Zheng | G02B 21/06 348/79 |
| 2013/0016885 | A1 | 1/2013 | Tsujimoto | |
| 2013/0280752 | A1 | 10/2013 | Ozcan et al. | |
| 2013/0329120 | A1 * | 12/2013 | Hiasa | H04N 5/23212 348/345 |
| 2013/0342852 | A1 * | 12/2013 | Fujimoto | G01B 11/14 356/614 |
| 2014/0071313 | A1 * | 3/2014 | Hiasa | G06T 5/50 348/231.99 |
| 2014/0118529 | A1 | 5/2014 | Zheng et al. | |
| 2014/0133702 | A1 * | 5/2014 | Zheng | G06K 9/00624 382/103 |
| 2014/0285818 | A1 * | 9/2014 | Holz | G01S 17/42 356/614 |
| 2014/0369558 | A1 * | 12/2014 | Holz | G06K 9/00201 382/103 |
| 2015/0087902 | A1 | 3/2015 | Mertz et al. | |
| 2015/0160450 | A1 | 6/2015 | Ou et al. | |
| 2015/0317508 | A1 | 11/2015 | Zheng et al. | |
| 2016/0110872 | A1 * | 4/2016 | Wu | H04N 9/27 382/154 |
| 2017/0167856 | A1 | 6/2017 | Stoppe et al. | |
| 2017/0261741 | A1 | 9/2017 | Stoppe et al. | |
| 2017/0269344 | A1 * | 9/2017 | Kato | G02B 21/006 |
| 2017/0270662 | A1 * | 9/2017 | Kato | G02B 21/06 |
| 2017/0272704 | A1 * | 9/2017 | Kato | H04N 5/2256 |

FOREIGN PATENT DOCUMENTS

| | | | |
|---|---|---|---|
| CN | 103727919 A | 4/2014 | |
| CN | 103905797 A | 7/2014 | |
| DE | 3906555 A1 | 7/1989 | |
| DE | 102004012125 B3 | 9/2005 | |
| DE | 102009012248 A1 * | 9/2009 | G02B 7/365 |
| DE | 102009012248 A1 | 9/2009 | |
| DE | 102011054106 A1 | 4/2013 | |
| DE | 102012218863 A1 | 4/2014 | |
| DE | 102014109687 A1 | 1/2016 | |
| DE | 102014112242 A1 | 3/2016 | |
| DE | 102014112648 A1 | 3/2016 | |
| DE | 102014112666 A1 | 3/2016 | |
| DE | 102014113433 A1 | 3/2016 | |
| TW | 201428339 A | 7/2014 | |

OTHER PUBLICATIONS

Dong, Siyuan, et al., "Aperture-scanning Fourier Ptychography for 3D Refocusing and Super-resolution Macroscopic Imaging", Optics Express, vol. 22, No. 11, Jun. 2, 2014, 14 pages.

Dong, Siyuan, et al., "FPscope: a Field-portable High-resolution Microscope Using a Cellphone Lens", Biomedical Optics Express, vol. 5, No. 10, Oct. 1, 2014, 6 pages.

Dowski, Edward R, et al., "Extended Depth of Field Through Wave-front Coding", Applied Optics, vol. 34, No. 11, Apr. 10, 1995, pp. 1-8.

Horstmeyer, R., et al., "Diffraction Tomography with Fourier Ptychography", Department of Electrical Engineering, Institute of Technology, Pasadena, CA, UA, 22 pages.

Kawata, et al., "Optical Microscope Tomography. I. Support Constraint", Journal of the Optical Society of America, Jan. 1, 1987, pp. 1-6.

Zheng, et al., "Wide-field, High-resolution Fourier Ptychographic Microscopy", Nature Photonics, Jul. 28, 2013, pp. 1-8.

* cited by examiner

DETERMINING THE POSITION OF AN OBJECT IN THE BEAM PATH OF AN OPTICAL DEVICE

TECHNICAL FIELD

Various aspects relate to a method for determining a position of an object parallel to the optical axis of an optical device and to a corresponding device.

BACKGROUND

Determination of the position of an object to be imaged, parallel to the optical axis of an optical device (z position), may be desirable for various reasons. For instance, by means of the known z position, it may be possible to position the object optimally within the focal plane of the optical device, so as to be able to produce a particularly sharp image of the object. In the case of objects which are extended perpendicularly to the optical axis, it may be desirable to determine the z position for different points of the object perpendicularly to the optical axis, in order to be able to focus the relevant image section. It may also be desirable to compile a height profile of the object by means of optical techniques.

Existing techniques, for example, allow determination of the z position by means of positioning the object at different reference positions. With the aid of the sharpness of the object at the different reference positions, it is then possible to assess whether or not the object lies in the focal plane. Often, however, it may be possible to determine a sharpness of the object only with limited accuracy. For this reason, such a previously known technique may be relatively inaccurate. Interferometric techniques for determining the z are furthermore known. Such techniques allow relatively high accuracy in the determination of the z position; the corresponding devices, however, may be relatively complex and expensive.

SUMMARY

There is therefore a need for an improved technique for determining a position of an object parallel to the optical axis of an optical device. In particular, there is a need for such techniques which mitigate at least some of the above-identified drawbacks.

This object is achieved by the independent claims. The dependent claims define embodiments.

According to a first aspect, the present application relates to a method for determining a position of an object parallel to the optical axis of an optical device. The method comprises illumination of the object from a first illumination direction and acquisition of a first image of the object during the illumination. The method furthermore comprises illumination of the object from a second illumination direction and acquisition of a second image of the object during the illumination. The method furthermore comprises determination of a distance between two imaging locations of the object in the first image and in the second image. The method furthermore comprises determination of a position of the object parallel to the optical axis on the basis of the distance.

In other words, it may thus be possible to illuminate the object sequentially from the first and second illumination directions, and to acquire an image of the object in each case. In particular, the first illumination direction and/or the second illumination direction may make an angle with that axis of the optical device along which an idealised light ray experiences no deviation or only minor deviation (optical axis). In such a case, the imaging location of the object in a corresponding image may be displaced if the object does not lie in the focal plane of the optical device. By determining the distance in relation to the first and second illumination directions, it may be possible to draw conclusions about the position. In a simple model, this effect may be interpreted by modified parallax in relation to the illumination direction.

Determination of the position may in this case mean: quantitative determination of the position, for example in relation to the focal plane or in relation to another suitable reference system of the optical device; and/or qualitative determination of the position, for example in relation to the criterion of whether or not a particular predetermined position parallel to the optical axis, for example the focal plane, is reached.

For example, it may be possible for the first illumination direction to be characterized by a first angle with respect to the optical axis, and for the second illumination direction to be characterized by a second angle with respect to the optical axis. The determination of the position of the object may furthermore be based on the first angle and the second angle. In such a case, it may in particular be possible that the determination of the position of the object furthermore comprises: quantification of the position of the object in relation to the focal plane of the optical device with the aid of trigonometric relationships between the first angle, the second angle and the distance.

With such an approach, it may be possible to carry out a relatively accurate determination of the position of the object parallel to the optical axis, for example only on the basis of the first and second images. In particular, it may be unnecessary, for example, to carry out a series of different images of the object for different reference positions of the object parallel to the optical axis. In other words, it may be possible to determine the position of the object only with the aid of the images for different illumination directions; it may be unnecessary to displace the object mechanically parallel to the optical axis. This may allow particularly rapid and accurate determination of the position. It may allow particularly simple implementation of the corresponding measurement process. For example, it may be possible, in contrast to conventional optical devices, for example microscopy devices, merely to modify an illumination device of the optical device; for example, it may be possible for a detection device of the optical device to remain unmodified.

It is, however, also possible that the method furthermore comprises positioning of the object at different reference positions parallel to the optical axis. The method may for example comprise, for each of the reference positions parallel to the optical axis, illumination of the object from the first illumination direction and acquisition of the first image, and illumination of the object from the second illumination direction and acquisition of the second image, and determination of the distance. The determination of the position of the object may then comprise: minimisation of the distance for the different reference positions. In such a case, it may in particular be possible to determine the position of the object parallel to the optical axis qualitatively. For example, for the case in which the distance is minimal, it may be assumed that the corresponding reference position parallel to the optical axis lies in or close to the focal plane. For example, two, three or more reference positions may be used. In principle, it is also possible to adapt the illumination directions as a function of the reference positions. Provision may also be made to acquire more than two images from more than two illumination directions for the different reference positions. In this way, a plurality of imaging locations may be determined, or redundant information may be obtained, so that particularly accurate position determination is made possible. Especially in scenarios in which the object has a certain periodicity, or is a periodic structure, particularly accurate determination of the position may be possible in this way.

In general, it may be possible, for example following the determination of the position of the object, to drive a focus unit of the optical device in order to position the object in the focal plane of the optical device as a function of the position which has been determined. In this way, it may be possible to carry out particularly rapid, reliable and accurate focusing onto the object. Subsequently, images of the object which have a particularly high quality may then be acquired.

Various techniques may be employed in order to determine the distance. For example, the determination of the distance may comprise: determination of a first reference point of the object in the first image and determination of a second reference point in the second image. The distance between the first reference point and the second reference point may be determined. The first and second reference points may correspond to a particular part of the object. The distance may be determined particularly accurately by suitable selection of the reference point.

In general, the choice of a suitable reference point is not particularly limited. In particular, it may be desirable to select a reference point which can be found and determined with a relatively high reliability and accuracy both in the first image and in the second image. An accuracy of the position which is determined may then be relatively high. Reference points which may be envisaged are, for example: significant features of the object; landmarks; machine-readable signs; points established by a user, etc.

If the object has a significant extent perpendicularly to the optical axis, the choice of the reference point may have an influence on the part of the object for which the position is determined. This may be important particularly in scenarios in which the object has a significant height profile. This is because a scenario may then arise in which focusing one part of the object entails defocusing another part of the object. In such a case, it may be desirable to produce a so-called focus map, i.e. information with position resolution, for example perpendicularly to the optical axis, about the position of the object.

For example, the determination of the distance may be carried out for a plurality of pairs of first reference points and second reference points. The determination of the position of the object may then be carried out with position resolution in a plane perpendicular to the optical axis on the basis of the plurality of pairs of first reference points and second reference points. In this way, it may for example be possible to position individual parts of the object deliberately in a focal plane of the optical device. This may be desirable particularly in the case of samples which are extended perpendicularly to the optical axis.

Typically, an accuracy of the determination of the position of the object parallel to or along the optical axis is correlated with an accuracy of the determination of the distance between the imaging locations of the object in the first image and the second image. This means that it may be desirable to determine the distance between the imaging locations particularly accurately. For example, the distance may be determined by means of techniques which are selected from the following group: landmark recognition; determining an optical centroid of the object in the first image and/or in the second image; user input; aberration correction.

For example, by taking into account previously known aberrations, for example in the illumination device of the optical device and/or in the detector optics of the optical device, it may be possible to take into account distortions in the first and second images that may lead to a displacement of the imaging locations of the object. Displacements may then be compensated for, or computationally reduced, and the actual distance may be determined particularly accurately.

According to another aspect, the present application relates to an optical device. The optical device is adapted to determine the position of an object parallel to the optical axis of the optical device. The optical device comprises an illumination device. The illumination device is adapted to illuminate the object from a first illumination direction and from a second illumination direction. The optical device furthermore comprises a detector, which is adapted to acquire a first image of the object during the illumination from the first illumination direction. The detector is furthermore adapted to acquire a second image of the object during the illumination from the second illumination direction. The optical device furthermore comprises a calculation unit, which is adapted determine a distance between imaging locations of the object in the first image and in the second image. The calculation unit is furthermore adapted to determine a position of the object parallel to the optical axis on the basis of the distance.

For example, the optical device according to the aspect currently being discussed may be adapted to carry out the method for determining a position of an object parallel to the optical axis according to a further aspect of the present application.

For such a device, effects may be achieved which are comparable to the effects that can be achieved for the method for determining a position of an object parallel to the optical axis according to a further aspect of the present application.

The features explained above, and features which will be described below, may be used not only in the corresponding combination is explicitly explained, but also in further combinations or individually, without departing from the protective scope of the present invention.

The above-described properties, features and advantages of this invention, and the way in which they are achieved, will become more clearly and readily compensable in conjunction with the following schematic description of exemplary embodiments, which will be explained in more detail in connection with the drawings.

DETAILED DESCRIPTION OF EMBODIMENTS

The present invention will be explained in more detail below with the aid of preferred embodiments with reference to the drawings. In the figures, references which are the same denote elements which are the same or similar. The figures are schematic representations of different embodiments of the invention. Elements represented in the figures are not necessarily represented to scale. Rather, the various elements represented in the figures are depicted in such a way that their function and general purpose can be understood by the person skilled in the art. Connections and couplings represented in the figures between functional units and elements may also be implemented as an indirect connection or coupling. A connection or coupling may be implemented in a wired or wireless fashion. Functional units may be implemented as hardware, software or a combination of hardware and software.

Techniques, by means of which a position of an object parallel to the optical axis of an optical device (z position) can be determined, will be described below. In the three-dimensional space which is spanned by x,y,z axes, the z component of the position may thus be determined; the optical axis defines the z axis, and is for example parallel thereto. On the basis of the z position which has been determined, for example, a focus unit of the optical device may be driven and the object may in this way be positioned in the focal plane of the device as a function of the z position which has been determined (focusing of the object). Images of the object which represent the object particularly sharply may subsequently be acquired. Such techniques may be employed in a wide variety of fields, for example in microscopy or in florescence measurement, or in parallel with phase-contrast imaging.

For the exemplary application of florescence measurement, it may for example be possible to determine the z position before and/or during the florescence measurement by means of the techniques described below. It is thereby possible to ensure that the fluorescent object lies in the focal plane of the optical device during the measurement; in this way, an accuracy during the florescence measurement can be increased. The techniques described in detail below are based on evaluating a first image and a second image under illumination of the object from different first and second illumination directions. In this case, the illumination may, for example, be carried out in particular with a wavelength which lies outside the active florescence range of the florescent sample. In principle, the z position may thus be determined simultaneously with the florescence measurement. This may, for example, make it possible to position moving objects as a function of time reliably in the focal plane. Furthermore, the z position may in general be determined from only two illumination processes; in this way, a phototoxic effect on the fluorescent object may also be reduced. When measuring dyes, the wavelength of the light for determining the z position may, for example, be selected outside the excitation range of the dyes. In this way, bleaching of the dyes can be reduced or avoided. A possible wavelength of the light which is used for determining the z position might, for example, lie in the infrared range.

In various scenarios, there may in particular already be images from different illumination directions, without these needing to be additionally acquired for the focusing according to the present techniques. Such a scenario might, for example, be the determination of a phase-contrast image, for example with techniques of Fourier ptychography. It may then be possible—without further light exposure of the object—to use the present techniques in order to determine the z position.

Figure 1:
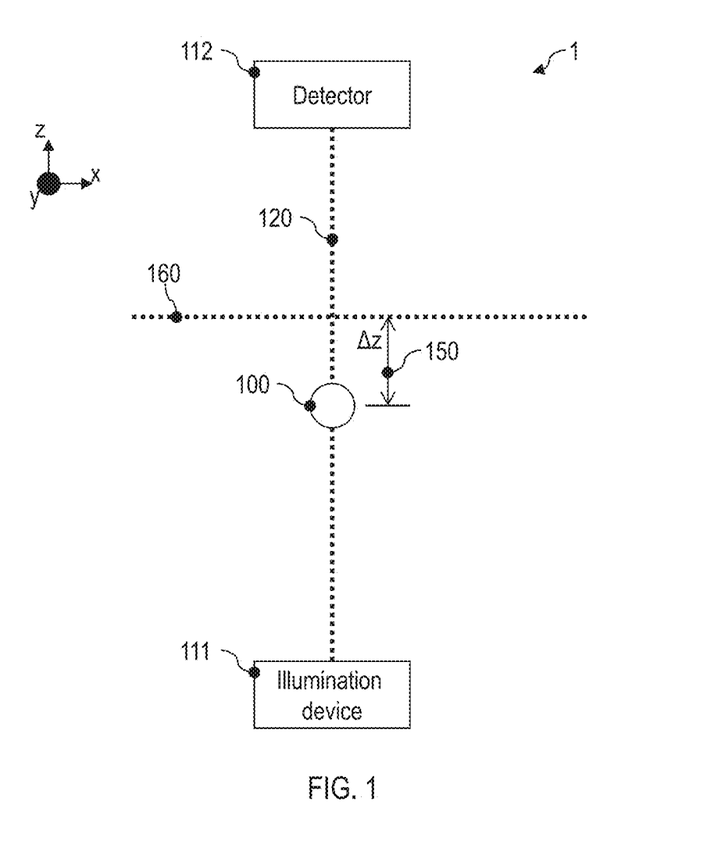
FIG. 1 illustrates a position of an object parallel to the optical axis of an optical device.

FIG. 1 schematically represents an optical device 1, for example a microscope. A beam path of the light extends from an illumination device 111 to a detector 112. The optical axis 120 and the focal plane 160 are represented in FIG. 1. It can be seen from FIG. 1 that the object 100 is placed parallel to the optical axis 120, outside the focal plane 160. A z position 150 is represented, which is measured in relation to the focal plane 160 (denoted by $\Delta z$ in FIG. 1). In such a case, it may be particularly simply and rapidly possible to drive the focus unit of the optical device 1 in order to carry out focusing. In particular, it may be unnecessary to carry out conversion of the z position 150 in relation to the focal plane 160, for example. It might also be possible to determine the position of the object 100 in another suitable reference coordinate system of the optical device.

Figure 2:
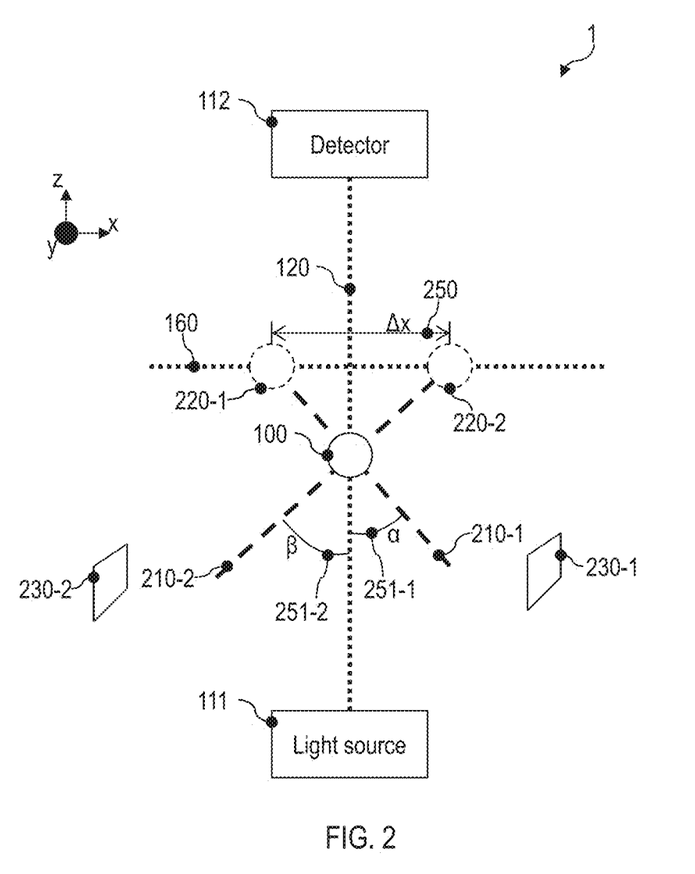
FIG. 2 illustrates imaging locations of the object in a first image and in a second image, which are acquired for different illumination directions, for the scenario of FIG. 1.

In FIG. 2, a first illumination direction 210-1 and a second illumination direction 210-2 are furthermore represented. A first image 230-1 is acquired for the first illumination direction 210-1. A second image 230-2 is acquired for the second illumination direction 210-2. As can be seen from FIG. 2, the illumination direction 210-1 makes a first angle 251-1 with the optical axis 120. An imaging location 220-1 of the object 100 therefore appears offset towards the left in relation to the optical axis 120 in the first image 230-1 according to FIG. 2. In FIG. 2, the first angle 251-1 is denoted as a. As can furthermore be seen from FIG. 2, the imaging location 220-2 of the object 100 in the second image 230-2 is offset towards the right in relation to the optical axis 120. This is the case because of the second angle 251-2 (denoted by $\beta$ in FIG. 2) which the second illumination direction 210-2 makes with the optical axis 120. From FIG. 2, it can be seen that a magnitude of the first angle 251-1 is different from a magnitude of the second angle 251-2. In general, it would be possible for the first and second illumination directions 210-1, 210-2 to be arranged symmetrically in relation to the optical axis 120. It would, for example, also be possible for only one of the two directions 210-1, 210-2 to be oriented parallel to the optical axis 120. In general, it is also possible for the object 100 to have an offset in relation to the optical axis 120, i.e. for it to be displaced in relation to the optical axis 120 within an xy plane. In general, it is furthermore not necessary for the first illumination direction 210-1, the second illumination direction 210-2 and the optical axis 120 to lie in a plane (in the scenario of FIG. 2 in the xz plane). This means that the first illumination direction 210-1 and/or the second illumination direction 210-2 may be tilted out of the xy plane.

Since illumination of the object 100 takes place with finite angles 251-1, 251-2 in relation to the optical axis 120, even a pure phase object, which causes no attenuation or only minor attenuation of the amplitude of the light passing through, may be imaged in the first and second images 230-1, 230-2. This allows versatile application of the present techniques to different samples, in particular for example biological samples.

FIG. 2 furthermore represents a distance 250 between the imaging locations 220-1, 220-2 of the object 100 in the first and second images 230-1, 230-2 (denoted in FIG. 2 by $\Delta x$). First, it may be established qualitatively that the distance 250 does not vanish; there is a parallax effect. In this way, the z position 150 can already be determined qualitatively as not being equal to 0. For example, it would be possible to determine the z position 150 qualitatively as being equal or close to 0 by iterative repositioning of the object 100 at different reference positions (not shown in FIG. 2) parallel to the optical axis 120. To this end, the object could, for instance, the repositioned iteratively parallel to the optical axis 120 until the distance 250 is minimised.

It would, however, also be possible for the determination of the z position 150 to be furthermore based on the first angle 251-1 and the second angle 251-2. The z position 150 may then be determined quantitatively. To this end, as explained below, trigonometric relationships between the first angle 251-1 and the second angle 251-2 and the distance 250 may be taken into account.

For the scenario of FIG. 2, the following applies:

$$\Delta z = a \cdot \cos \alpha = b \cdot \cos \beta, \quad (1)$$

where a denotes a distance between the object 100 and the imaging location 220-1 of the object 100 in the first image 230-1 along the first illumination direction 210-1, and b denotes a distance between the object 100 and the imaging location 220-2 of the object 100 in the second image 230-2 along the second illumination direction 210-2 (a and b are not represented in FIG. 2). This formula derives from the definition of the cosine for right-angled triangles.

By using the sine rule for triangles in general, the following is obtained:

$$\frac{\Delta x}{\sin(\alpha + \beta)} = \frac{b}{\sin(90° - \alpha)} = \frac{b}{\cos \alpha}. \quad (2)$$

Combination of Equations 1 and 2 gives:

$$\Delta z = \Delta x \cdot \frac{\cos \alpha \cos \beta}{\sin(\alpha + \beta)}. \quad (3)$$

With the aid of Equation 3, it is possible to determine the z position 150 on the basis of the first angle 251-2 and the second angle 251-2, and furthermore on the basis of the separation 250 of the imaging locations 220-1, 220-2. In particular, the z position 150 may be determined merely by twofold illumination and simultaneous acquisition of the first and second images 230-1, 230-2. A light exposure of the object 100 can be minimised, for example compared with the aforementioned scenario with iterative positioning of the object 100 at different reference positions parallel to the optical axis 120.

It may be desirable to increase an accuracy of the determination of the z position 150. The accuracy of the determination of the z position 150 is typically related directly to the first angle 251-1, the second angle 251-2 and the distance 250. The accuracy in the determination of the z position 150 may therefore be limited at least by a pixel size in the first image 230-1 and in the second image 230-2.

An error in the distance—referred to below as Δx'—leads in the following way to an error in the z position 150:

$$\Delta z' = \Delta x' \cdot \frac{\cos \alpha \cos \beta}{\sin(\alpha + \beta)}. \quad (4)$$

If the object 100 has a significant extent in the xy plane, it may for example be desirable to determine the distance 250 between particular reference points in the first image 230-1 and in the second image 230-2. The reference points may mark a particular part of the object 100, for example a particularly significant part or a part which is particularly important for the imaging. In general, it is also possible to determine the distance 250 for a plurality of pairs of reference points of the object 100. In this way, it may be possible to determine the z position 150 respectively for different parts of the object 100 by repeated application of Equation 3. In other words, the z position 150 may thus be determined with position resolution in the xy plane.

It may thus be desirable to determine the distance 250 particularly accurately. In this context, it may be possible to use a wide variety of techniques that allow particularly accurate determination of the distance 250. Such techniques may, for example, comprise: landmark recognition; determination of an optical centroid of the object 100 in the first image 230-1 and/or in the second image 230-2; user input; aberration correction. In one simple scenario, for example, the user might select a particular reference point of the object 100 in the first image 230-1 and the corresponding reference point in the second image 230-2. By means of landmark recognition, it may for example be possible to carry out such selection of reference points in an at least partially automated way. It would also be possible to use the optical centroid as a reference point for determining the distance 250. The aberration correction may, for example, be used in order to take into account known imaging errors due to aberrations in the optical device 1.

A further limitation of the accuracy during the determination of the z position 150 may result from the coherent depth of focus of the detector 112 of the optical device 1. In particular, it is expedient to ensure that the object 100—even with a significant displacement in relation to the focal plane 160—is still imaged in the first image 230-1 and in the second image 230-2. It may, however, be unnecessary to achieve sharp imaging of the object 100; in particular, techniques as described above, for example determination of the optical centroid of the object 100, may also be used in a case in which the object 100 is only imaged very coarsely in the images 230-1, 230-2.

While FIGS. 1 and 2 show a situation in which the object 100 is positioned along the optical axis 120, i.e. it intersects the optical axis 120, by means of the techniques described above the position may also be determined for scenarios in which the object 100 has a particular offset parallel to the x direction and/or parallel to the y direction in relation to the optical axis 120. In general terms, the techniques described above for determining the position 150 of the object parallel to the optical axis 120 thus make it possible to determine the z component of the position of the object 100 in the three-dimensional space which is spanned by the x,y,z axes.

FIG. 2 furthermore shows a situation in which two illumination directions 210-1, 210-2 are used for determining the z position. In general, it is also possible to use a larger number of illumination directions 210-1, 210-2 for determining the z position 150 of the object 100. For example, three, four or ten or more illumination directions 210-1, 210-2 may be used. It would, for example, also be possible respectively to use the aforementioned techniques pairwise for the different illumination directions 210-1, 210-2, and for example respectively to apply Equation 3 pairwise. In this way, for example, the z position 150 of the object 100 may be determined several times, and a suitable average value may be formed therefrom. In this way, for example, it may be possible to determine the z position 150 of the object 100 particularly accurately. In general, a wide variety of techniques may be used for combining a sizeable dataset consisting of the imaging locations 220-1, 220-2 of a plurality of illumination directions 210-1, 210-2. For example, Equation 3 might be modified suitably, or a plurality of z positions, which are obtained from the different illumination directions 210-1, 210-2, might be consolidated after multiple application of Equation 3. In other words, a higher accuracy may be achieved during the determination of the z position 150 by a plurality of illumination directions 210-1, 210-2, or redundant illumination directions 210-1, 210-2; for example, it is in particular possible to achieve an accuracy which is higher than a resolution of corresponding images from which the imaging locations 220-1, 220-2 are determined.

Figure 3:
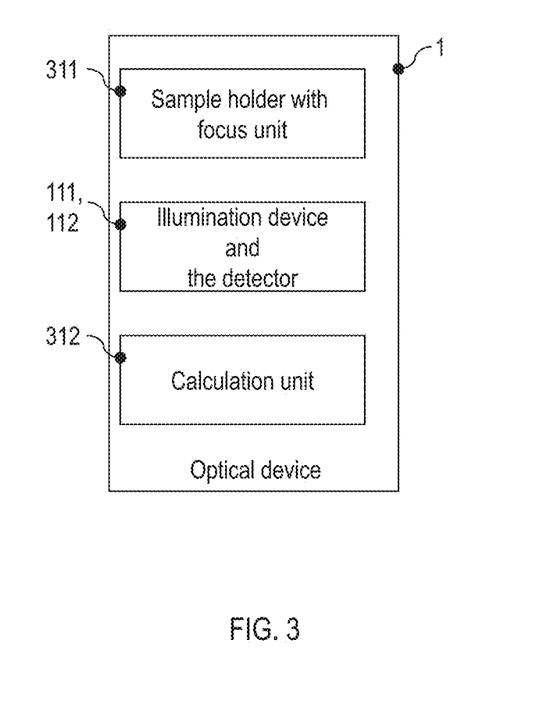
FIG. 3 schematically shows an optical device.

FIG. 3 represents the optical device 1 schematically. The optical device 1 comprises the illumination device 111 and the detector 112. A sample holder having a focus unit 311 is furthermore provided. The focus unit may be adapted to position the object 100 parallel to the optical axis 120, for example in order to approach or focus different reference positions. The optical device 1 furthermore comprises a calculation unit 312. The calculation unit 312 is adapted to carry out various steps in connection with the determination of the z position 150, as explained above. The calculation unit 312 may be coupled to a memory (not shown in FIG. 3). Corresponding working instructions and commands for carrying out the aforementioned techniques by the calculation unit 312 may be stored in the memory, for example a nonvolatile or volatile memory. For example, the calculation unit 312 may receive commands from the memory in order to determine the z position 150 with the aid of Equation 3, or to find reference points inside the first and second images 230-1, 230-2 and then determine the distance 250.

In general, it is possible to carry out yet further tasks—besides the determination of the z position 150—by means of the optical device 1, for example fluorescence measurements. In such a case, the determination of the z position 150 may be carried out on the basis of the first and second images 230-1, 230-2 by auxiliary optics, which for example have a small aperture with a high depth of focus—so that it is possible to ensure that the distance 250 can still be determined reliably for large z positions 150. In order to carry out the actual fluorescence measurement, it is then possible to use further optics, which for example have a large aperture in order to work particularly intensively in terms of light. Parallel acquisition of the first and second images 230-1, 230-2 and conduct of the fluorescence measurement may be possible in this way.

In principle, a wide variety of illumination devices 111 may be used in order to carry out the illumination of the object 100 with the different illumination directions. A scanner mirror may for example be used, for example in a field stop plane of the illumination device 111. An adaptive component could also be used in an aperture diaphragm or illumination pupil of the illumination apparatus; for example, the illumination device 111 according to German Patent Application 10 2014 101 219.4 could be used. An adaptive component might, for example, be a spatial light modulator (SLM) or a digital micromirror device (DMD) or a mobile or displaceable sigma aperture. It would also be possible for the illumination device 111 to comprise a light-emitting diode array. For example, the light-emitting diodes (LEDs) of the LED array may be arranged on a Cartesian grid. Then, for example, a particular illumination direction 210-1, 210-2 may be implemented by driving a particular light-emitting diode, which is at a particular distance from the optical axis 120, of the light-emitting diode array.

Figure 4:
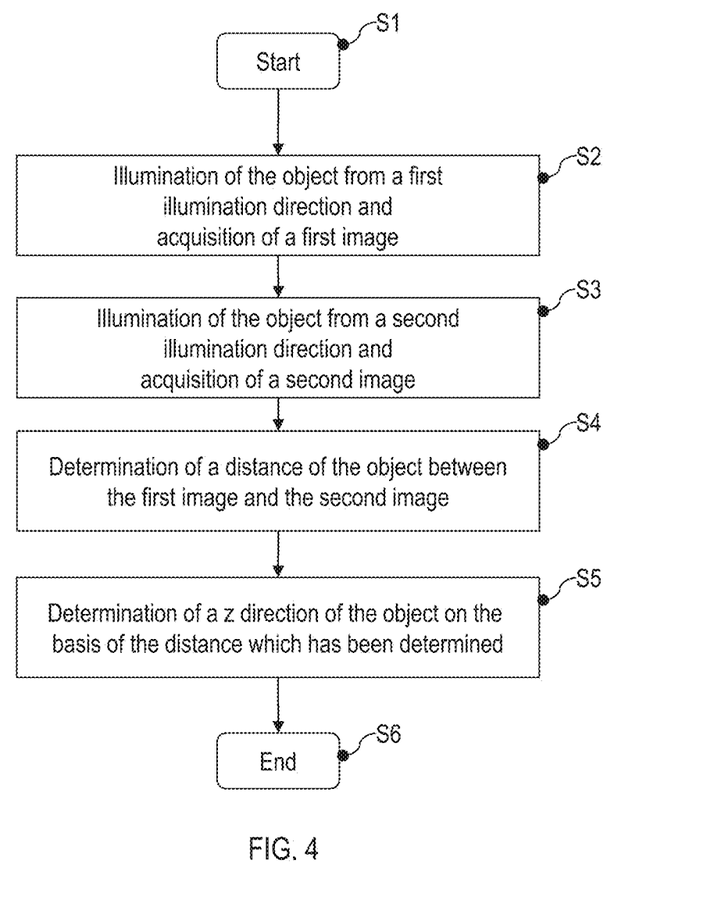
FIG. 4 is a flowchart of a method for determining the position of the object parallel to the optical axis.

FIG. 4 represents a method for determining the z position 150 of the object 100 according to various embodiments. The method starts in step S1. First, in step S2, the object 100 is illuminated from the first illumination direction 210-1 and the first image 230-1 is acquired. In step S3, the object 100 is illuminated from the second illumination directions 210-2 and the second image 230-2 is acquired. Then, in step S4, the distance 250 between the two imaging locations of the object in the first and second images 230-1, 230-2 is determined. Subsequently, in step S5, determination of the z position 150 is carried out. In step S5, the determination of the z position 150 may, for example, be carried out qualitatively or be carried out quantitatively. For quantitative determination of the z position 150, for example, Equation 3 may be used. It would also be possible—in addition to steps S2-S4—to illuminate the object from further illumination directions 210-1, 210-2, for example from a third illumination direction and from a fourth illumination direction. The redundant information may be taken into account in step S5.

Figure 5:
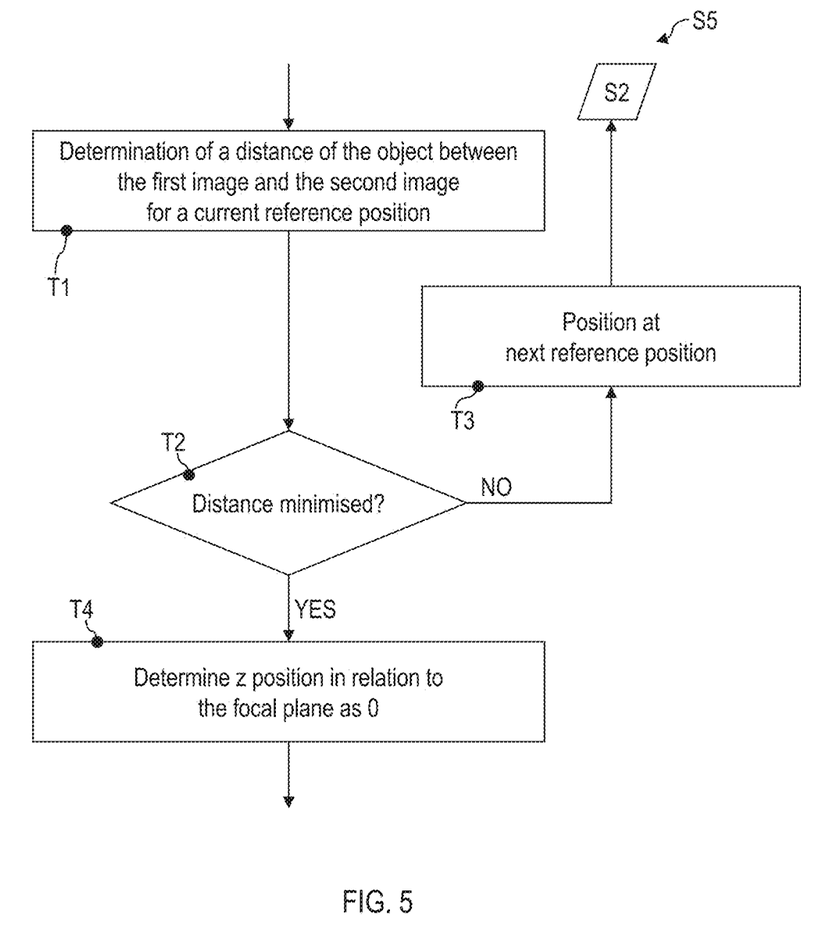
FIG. 5 shows the iterative positioning of the object at different reference positions parallel to the optical axis, order to determine the position qualitatively.

It would, however, also be possible to determine the z position 150 qualitatively in step S5 by iterative repositioning of the object 100 parallel to the optical axis 120. Such a scenario is represented in FIG. 5. First, in step T1, the distance 250 of the object 100 between the first image 230-1 and the second image 230-2 is determined for a current reference position of the object 100 parallel to the optical axis 120. In step T2, a check is made as to whether the distance 250 is minimised. For example, a threshold value comparison with a predetermined threshold value may be carried out in step T2. It would also be possible in step T2 to check whether the distance 250 has been reduced compared with earlier determinations of the distance (during previously carried out iterations of step T1).

If it was found in step T2 that the distance 250 has not been minimised, then step T3 is carried out. In step T3, the object 100 is positioned at a next reference position parallel to the optical axis 120. The reference position may be determined by an iterative method; the reference position could also be predetermined in a fixed way. The method is then continued with step S2 (cf. FIG. 4). In particular for determination of the z position 150 by means of iterative techniques, as represented FIG. 5, it may be desirable to use more than two illumination directions 210-1, 210-2 for determining the distance 250. For example, a check of whether the distance 250 is minimised for all pairs of illumination directions 210-1, 210-2 might then be made in step T2.

If it is found in step T3 that the distance 250 is minimised, however, then the z position 150 is determined as zero in relation to the focal plane 160 in step T4.

Figure 6:
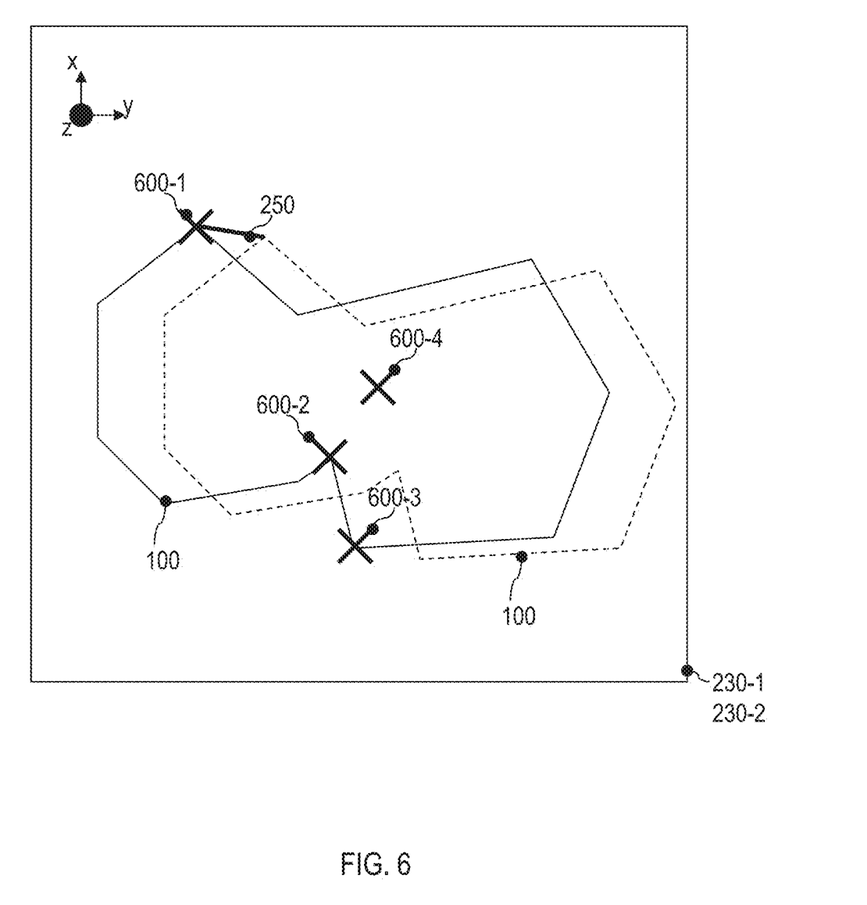
FIG. 6 illustrates imaging of the object in first and second images, the object being extended perpendicularly to the optical axis, reference points for determining the distance being represented.

FIG. 6 schematically represents imaging of the object 100 in the first image 230-1 (shown by a solid line in FIG. 6) and in the second image 230-2 (with a dashed line in FIG. 6). The object 100 has a significant extent in the xy plane, i.e. perpendicularly to the optical axis 120. Four possible reference points 600-1, 600-2, 600-3, 600-4 for the imaging of the object 100 in the first image 230-1 are represented. In principle, the choice of the reference points 600-1-600-4 is not particularly limited. The reference points 600-1-600-4 represented in FIG. 6 can, however, be found particularly reliably in the first and second images 230-1, 230-1. For example, the distance 250 between the first reference points 600-1 could be determined (cf. FIG. 6), since this is the most highly placed point of the object 100 in the images 230-1, 230-1 and can therefore be found easily and reliably. The reference point 600-4 denotes, for example, the optical centroid of the object 100 in the images 230-1, 230-2.

In summary, techniques which—for example by applying Equation 3 or by repositioning the object parallel to the optical axis—allow particularly rapid and accurate determination of the z position 150 have been described above. Rapid focusing of the object 100 is thereby possible.

Figure 7:
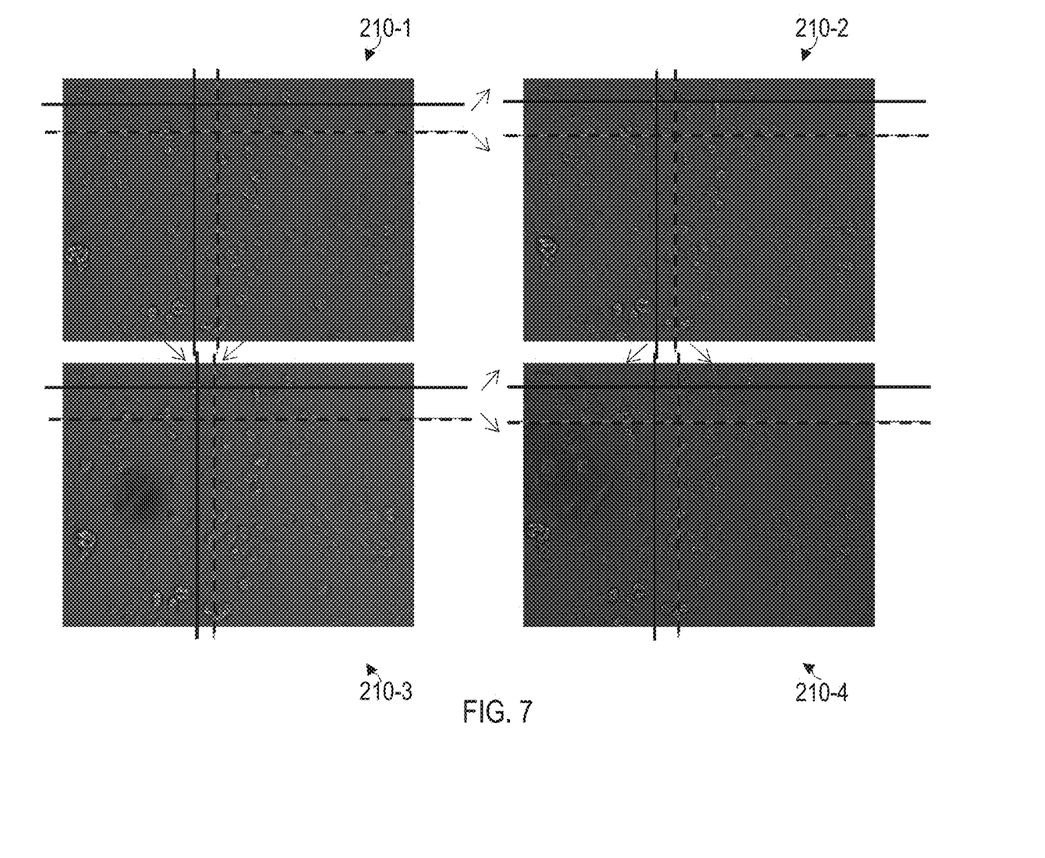
FIG. 7 illustrates experimental results of a method according to different embodiments.

FIG. 7 represents the experimental results for a sequence of four images, which were acquired during illumination of a sample from four different illumination directions 210-1, 210-2, 210-3, 210-4 according to techniques described here. The different illumination directions 210-1, 210-2, 210-3, 210-4 all have a different angle in relation to the axis 120.

In detail, the experimental setup comprised a microscope 100 having an illumination device 111, which had an LED array with twenty-four LEDs. Except for the illumination direction 210-1, 210-2, 210-3, 210-4, no other experimental parameters were varied. The images were acquired in transmission geometry.

The sample contained an immersion fluid in which there were stationary cells, i.e. the cells did not change their position as a function of time. The cells were concentrated in two different planes of the immersion fluid, i.e. at different positions parallel to the optical axis.

In FIG. 7, for each of the four images, a particular cell which was positioned in the upper plane of the immersion fluid is marked by a solid line (the cell lies at the intersection of the lines); furthermore, a particular cell which was positioned in the lower plane of the immersion is marked by a dashed line (the cell lies at the intersection of the lines).

From a comparison of the four individual images, it can be seen that an imaging position of the two cells in the images varied as a function of the illumination direction 210-1, 210-2, 210-3, 210-4. This may be described in a simple model by the modified parallax in relation to the illumination directions 210-1, 210-2, 210-3, 210-4. Shadow effects occur.

It can furthermore be seen from a comparison of the four individual images that a direction of the modification of the imaging position of the two cells between the images as a function of the illumination directions 210-1, 210-2, 210-3, 210-4 runs oppositely. This is the case since, in the experiment, the z position of one cell lay in front of the focal plane 160 and the z position of the other cell lay behind the focal plane 160. By a quantitatively analysis of the modification, it was possible to determine the precise position of the cells along the optical axis. To this end, the different angles of the illumination directions 210-1, 210-2, 210-3, 210-4 were taken into consideration (not shown in FIG. 7).

Of course, the features of the embodiments and aspects of the invention as described above may be combined with one another. In particular, the features may be employed not only in the combinations described, but also in other combinations or individually, without departing from the scope of the invention.

For example, techniques in which the object is illuminated from two illumination directions have in particular been described above. This may be advantageous in particular when exposure of the object to light is intended to be minimised. In general, however, it would also be possible to use a larger number of illumination directions, for example when it is necessary to determine the position of the object parallel to the optical axis particularly accurately.

Furthermore, scenarios in which essentially the entire object is focused have been discussed above with reference to the figures. In general, however, it may be possible respectively to focus only a relevant image section, which images only a part of the object, and to determine the z position of the relevant part of the object.

Furthermore, scenarios in which the object is positioned perpendicularly to the optical axis, in such a way that it intersects the optical axis, have primarily been discussed above. It would, however, also be possible for the object to be offset in relation to the optical axis.

The invention claimed is:

1. A method for determining a depth of an object relative to a focal plane that is perpendicular to an optical axis of an optical device, the method comprising:
    illuminating the object from a first illumination direction and acquiring a first image of the object during the illumination, wherein an angle of the first illumination direction relative to the optical axis, as a first angle, produces a first imaging location of the object in the first image;
    illuminating the object from a second illumination direction and acquiring a second image of the object during the illumination, wherein an angle of the second illumination direction relative to the optical axis, as a second angle, produces a second imaging location of the object in the second image;
    determining a distance between the first and second imaging locations; and
    determining the depth of the object relative to the focal plane on the basis of the distance and further on the basis of the first angle and the second angle.

2. The method according to claim 1,
    wherein the determination of the position of the object furthermore comprises:
    quantification of the position of the object in relation to the focal plane of the optical device with the aid of trigonometric relationships between the first angle, the second angle and the distance.

3. The method according to claim 1,
    wherein the method furthermore comprises:
    positioning of the object at different reference positions parallel to the optical axis,
    wherein the method comprises, for each reference position parallel to the optical axis, illumination of the object from the first illumination direction and acquisition of the first image, and illumination of the object from the second illumination direction and acquisition of the second image, and determination of the distance,
    wherein the determination of the position of the object comprises, minimisation of the distance for the different reference positions.

4. The method according to claim 1,
    wherein the method furthermore comprises:
    driving of a focus unit of the optical device in order to position the object in the focal plane of the optical device as a function of the position which has been determined.

5. The method according to claim 1,
    wherein the determination of the distance comprises:
    determination of a first reference point of the object in the first image, and
    determination of a second reference point in the second image,
    wherein the distance between the first reference point and the second reference point is determined.

6. The method according to claim 5,
wherein the determination of the distance is carried out for a plurality of pairs of first reference points and second reference points,
wherein the determination of the position of the object is carried out with position resolution in a plane perpendicular to the optical axis on the basis of the plurality of pairs of first reference points and second reference points.

7. The method according to claim 1,
wherein the distance is determined by means of techniques which are selected from the following group: landmark recognition; determining an optical centroid of the object in the first image and/or in the second image; user input; aberration correction.

8. An optical device, which is configured to determine a depth of an object relative to a focal plane that is perpendicular to an optical axis of the optical device,
wherein the optical device comprises:
an illumination device, which is configured to illuminate the object from a first illumination direction and from a second illumination direction;
a detector, which is configured to acquire a first image of the object during the illumination from the first illumination direction and a second image of the object during the illumination from the second illumination direction, wherein an angle of the first illumination direction relative to the optical axis, as a first angle, produces a first imaging location of the object in the first image and an angle of the second illumination direction relative to the optical axis, as a second angle, produces a second imaging location of the object in the second image; and
a calculation unit, which is configured to determine the depth of the object relative to the focal plane on the basis of a distance, as determined between the first and second imaging locations, and further on the basis of the first angle and the second angle.

* * * * *

UNITED STATES PATENT AND TRADEMARK OFFICE
CERTIFICATE OF CORRECTION

PATENT NO. : 10,670,387 B2
APPLICATION NO. : 15/324474
DATED : June 2, 2020
INVENTOR(S) : L. Stoppe et al.

Page 1 of 1

It is certified that error appears in the above-identified patent and that said Letters Patent is hereby corrected as shown below:

In the Specification

Column 4, Line 24, please change "adapted determine" to -- adapted to determine --

Column 7, Line 6, please change "the repositioned" to -- be repositioned --

Column 7, Line 42, please change "251-2" to -- 251-1 --

Column 8, Line 49, please change "the position" to -- the z position --

Column 10, Line 9, please change "directions 210-2" to -- direction 210-2 --

Column 10, Line 65, please change "230-1, 230-1" to -- 230-1, 230-2 --

Column 11, Lines 1, 2, please change "230-1, 230-1" to -- 230-1, 230-2 --

Signed and Sealed this
Twenty-fifth Day of August, 2020

Andrei Iancu
*Director of the United States Patent and Trademark Office*